United States Patent
Lee

(10) Patent No.: US 7,142,198 B2
(45) Date of Patent: Nov. 28, 2006

(54) METHOD AND APPARATUS FOR REMOTE POINTING

(75) Inventor: Jung-won Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 383 days.

(21) Appl. No.: 10/289,216

(22) Filed: Nov. 7, 2002

(65) Prior Publication Data

US 2003/0107748 A1   Jun. 12, 2003

(30) Foreign Application Priority Data

Dec. 10, 2001   (KR) .......................... 2001-0077793

(51) Int. Cl.
- G09G 1/00 (2006.01)
- G09G 3/28 (2006.01)
- G09G 3/22 (2006.01)
- G01B 11/14 (2006.01)
- G01C 3/00 (2006.01)

(52) U.S. Cl. .............. 345/180; 345/181; 345/182; 345/183; 345/156; 345/157; 345/158; 345/179; 356/3; 356/3.01; 356/614; 356/620; 356/621; 356/622; 356/623

(58) Field of Classification Search ........ 345/156–158, 345/179, 180–183; 356/3, 3.01, 614, 620–623
See application file for complete search history.

(56) References Cited

U.S. PATENT DOCUMENTS 5,491,546 A * 2/1996 Wascher et al. ........... 356/4.03
5,874,941 A * 2/1999 Yamada ..................... 345/157
5,926,168 A * 7/1999 Fan .......................... 345/158
5,969,820 A * 10/1999 Yoshii et al. .............. 356/623
6,727,885 B1 * 4/2004 Ishino et al. ............... 345/156

FOREIGN PATENT DOCUMENTS

| JP | 9-120340 | | 5/1997 |
| JP | 09120340 A | * | 5/1997 |
| KR | 1997-60988 | | 8/1997 |

* cited by examiner

Primary Examiner—Sumati Lefkowitz
Assistant Examiner—Alexander S. Beck
(74) Attorney, Agent, or Firm—Staas & Halsey LLP

(57) ABSTRACT

A remote pointing apparatus including a remote control that generates an optical signal that is periodically expanded and/or reduced around the origin and an optical sensor that detects whether the optical signal is received, and a remote pointing method therefor. The remote pointing method includes projecting an optical signal that is periodically expanded and/or reduced around an origin; detecting whether the optical signal is received using a plurality of optical sensors that are two-dimensionally disposed; and detecting the position of the origin, which exists within a position recognition range including at least a polygon having the optical sensors as vertexes, based on the results of detection of the optical sensors. Since the remote pointing apparatus and method do not need a light receiving panel that is installed to fully cover a display screen or installed in vertical and horizontal directions of the display panel in order to receive a laser beam, a manufacturing cost thereof can be reduced.

65 Claims, 7 Drawing Sheets

$$x_1^2 + y_1^2 = d_1^2$$

$$x_1^2 + y_2^2 = d_2^2$$

$$x_2^2 + y_2^2 = d_3^2$$

$$y_1 - y_2 = D_3$$

$$x_1 - x_2 = D_1$$

DISPLAY PANEL (a)     (b)     (c)

METHOD AND APPARATUS FOR REMOTE POINTING

CROSS-REFERENCE TO RELATED APPLICATIONS

This application claims the benefit of Korean Application No. 2001-77793, filed Dec. 10, 2001 in the Korean Intellectual Property Office, the disclosure of which is incorporated herein by reference.

BACKGROUND OF THE INVENTION

1. Field of the Invention

The present invention relates to a remote pointing apparatus, and more particularly, to a remote pointing apparatus including a remote controller, which generates an optical signal that is periodically expanded and/or reduced around the origin, and optical sensors that detect whether the optical signal is received.

2. Description of the Related Art

Remote pointing apparatuses are provided for digital televisions (DTVs) or web TVs so that searching program information, controlling a browser, or selecting a menu can be remotely performed using a remote controller. Conventional remote pointing apparatuses have a type of a touch pad or joystick. A touch pad type has a very low resolution and thus has difficulty with precision control. A joystick type is inconvenient for users because it is necessary to move a cursor to a point to be selected.

A mouse that is used for an existing computer can be used as a remote pointing apparatus. However, since a mouse requires a flat ground on which it rests and moves, even if the mouse operates in a wireless mode, it is inconvenient to freely use the mouse in a large room, e.g., a living room.

There has also been proposed a laser mode in which a user can intuitively point at a desired position using a laser beam. However, a light receiving panel that is installed in a display apparatus for receiving a laser beam is too expensive to be widely spread.

FIG. 1 is a diagram of a conventional remote pointing apparatus using a laser beam. The conventional remote pointing apparatus includes a remote controller 100 that projects a laser beam 110, and a detection panel 122 that is fully installed behind a display panel 120 in order to detect a position at which the laser beam 110 is pointed.

When a user presses a light projection button 102 on the remote controller 100, the laser beam 110 is projected on the display panel 120 to indicate a position to be selected. The laser beam 110 is transmitted through the display panel 120 and is projected on the detection panel 122.

When the user presses a selection button 104 after locating the laser beam 110 at a desired position on the display panel 120, for example, at a menu to be selected, the current position of the laser beam 110 is detected through the detection panel 122.

A main body 130 recognizes the selected position and takes action according to a menu item corresponding to the recognized position.

FIG. 2 is a diagram of another conventional remote pointing apparatus using a laser beam. The conventional remote pointing apparatus shown in FIG. 2 includes sensors 200 and 202 instead of the detection panel 122 shown in FIG. 1. The sensor 200 that is arranged in the horizontal direction of a monitor generates a detection signal for indicating the abscissa of a laser beam 110 projected from a remote controller, and the sensor 202 that is arranged in the vertical direction of the monitor generates a detection signal for indicating the ordinate of the laser beam 110.

Since the conventional remote pointing apparatus shown in FIG. 1 needs the detection panel 122 that is installed behind the display panel 120 to fully cover the display panel 120, it is very expensive. In addition, as the size of the display panel 120 increases, the price also increases.

In the meantime, the conventional remote pointing apparatus shown in FIG. 2 is less expensive than that shown in FIG. 1, but the position of the laser beam 110 can be correctly detected only when the laser beam 110 is projected to be nearly perpendicular to the monitor. Accordingly, a user cannot freely use it.

A remote pointing method according to an embodiment of the present invention includes projecting an optical signal, which is periodically expanded and/or reduced around an origin of the optical signal at which a user points, from a remote controller onto a display panel, detecting whether the optical signal is received using three sensors that are installed around the display panel, and comparing a time point when each sensor detects the optical signal with the period of expansion and/or reduction of the optical signal, thereby detecting the position of the origin, that is, a position pointed at by a user.

Accordingly, an inexpensive remote pointing apparatus that a user can easily and freely use as if using a laser pointer is desired.

SUMMARY OF THE INVENTION

Accordingly, it is an object of the present invention to provide a remote pointing method that allows a user to intuitively select a desired object as if using a laser pointer.

It is another object of the present invention to provide a remote pointing apparatus for the above remote pointing method.

It is a further object of the present invention to provide a remote controller for the remote pointing apparatus.

It is yet another object of the present invention to provide a display apparatus for the remote pointing apparatus.

Additional objects and advantages of the present invention will be set forth in part in the description that follows, and, in part, will be obvious from the description, or may be learned by practicing the present invention.

To achieve the above and other objects of the present invention, there is provided a remote pointing method including projecting an optical signal that is periodically expanded and/or reduced around an origin; detecting whether the optical signal is received using a plurality of optical sensors that are two-dimensionally disposed; and detecting the position of the origin, which exists within a position recognition range including at least a polygon having the optical sensors as vertexes, based on the results of detection of the optical sensors.

To achieve the above and other objects of the present invention, there is provided a remote pointing apparatus including a remote controller that generates an optical signal that is periodically expanded and/or reduced around an origin; a plurality of optical sensors that are disposed at the periphery of a position recognition range; and an arithmetic unit that calculates the position of the origin, which exists within the position recognition range, based on a state in which the optical signal is received by each optical sensor.

To achieve the above and other objects of the present invention, there is provided a remote controller including a light source that generates a diffusive optical signal; and a light transmission adjustor that adjusts the projected shape of the optical signal.

To achieve the above and other objects of the present invention, there is provided a display apparatus including a plurality of optical sensors that detect a state in which an optical signal that is periodically expanded and/or reduced around an origin is received and that are disposed at the periphery of a display screen; and an arithmetic unit which calculates the position of the origin based on the receiving state detected by each optical sensor.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
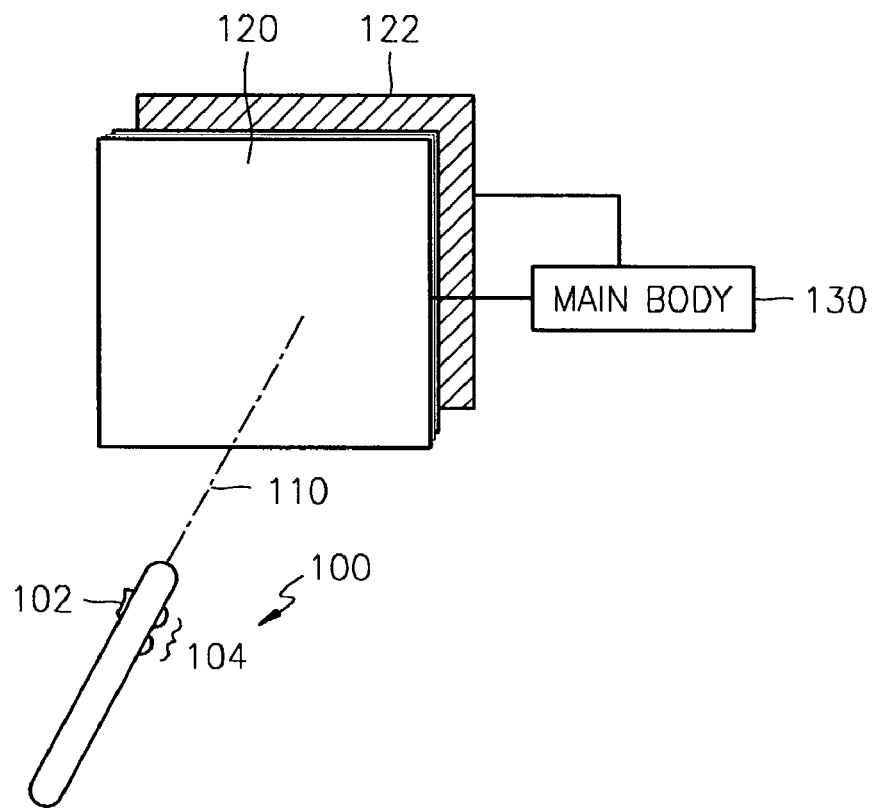
FIG. 1 is a diagram of a conventional remote pointing apparatus using a laser beam.
Figure 2:
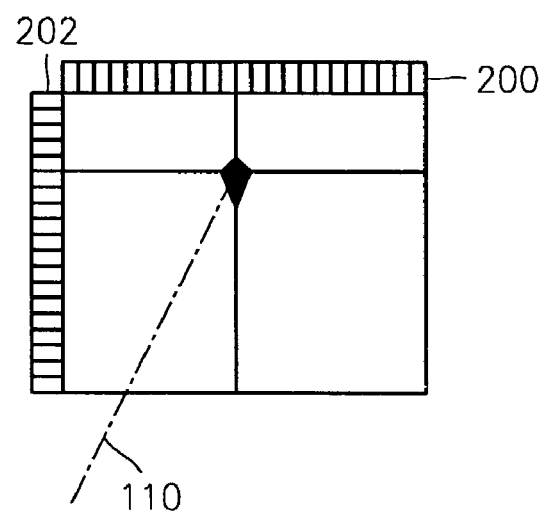
FIG. 2 is a diagram of another conventional remote pointing apparatus using a laser beam.

Reference will now be made in detail to the embodiments of the present invention, examples at which we illustrated in the accompanying drawings, wherein like reference numerals refer to like elements throughout.

Figure 3:
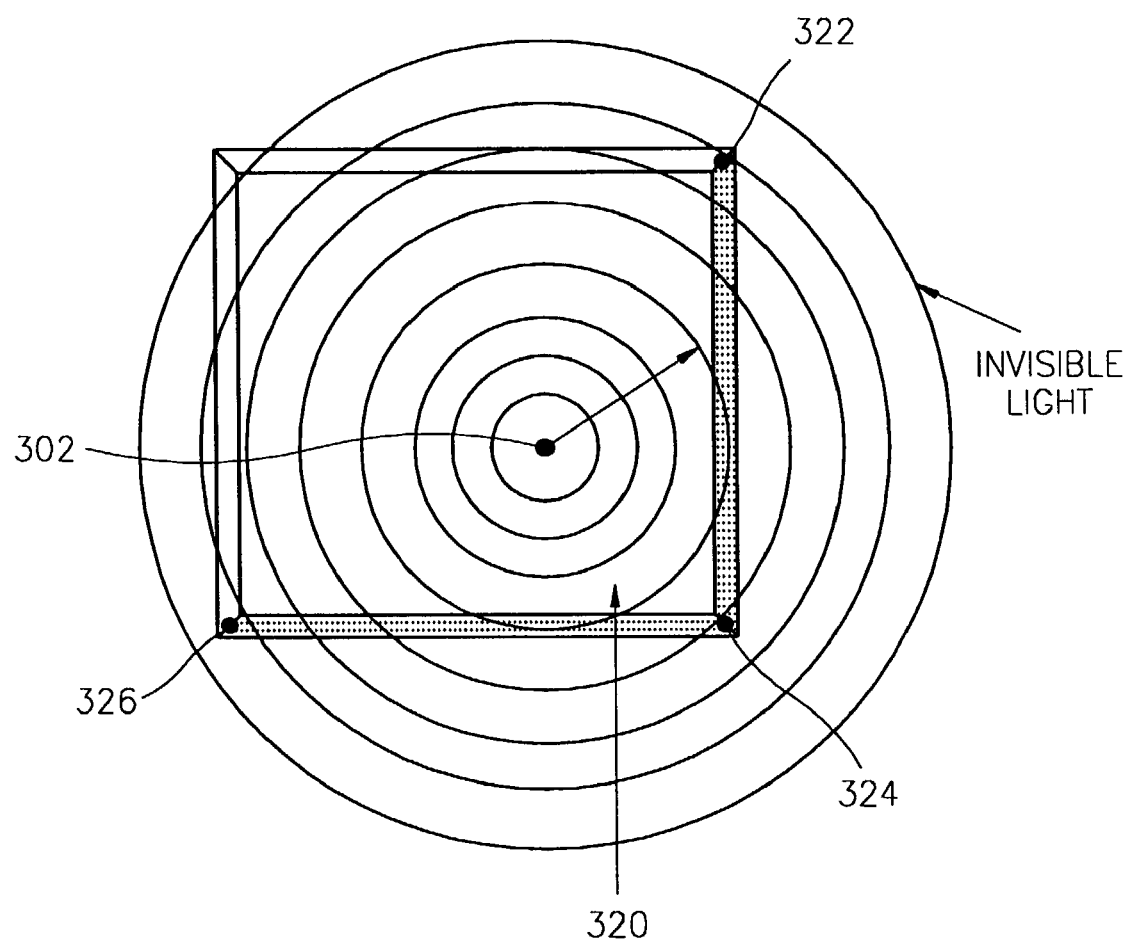
FIG. 3 is a diagram for explaining a remote pointing method, according to an embodiment of the present invention.

FIG. 3 is a diagram for explaining a remote pointing method, according to an embodiment of the present invention. The remote pointing method includes projecting an optical signal that is periodically expanded and/or reduced around the origin, detecting whether the optical signal is received using a plurality of optical sensors that are actually disposed on a two-dimensional plane, and recognizing the position of the origin within a position recognition range, which includes at least a polygon having the optical sensors as vertexes, based on the results of detection of the optical sensors.

The optical signal is generated from a remote controller having a light source that generates invisible light. The plurality of optical sensors are disposed around a position recognition range. The position recognition range includes at least the polygon having the optical sensors as vertexes and may be either a display panel of a display apparatus or a command input device having a plurality of selection buttons.

Although it is easier to detect the position of the origin as the number of optical sensor increases, it is preferable to use three optical sensors in economical and practical terms. In addition, it is preferable to dispose three optical sensors to form a right triangle and particularly a right isosceles triangle in order to reduce the amount of computations. It is assumed that the period of expansion and/or reduction of an optical signal and the distance between optical sensors are already known.

Referring to FIG. 3, an optical signal projected from a remote controller (not shown) is periodically expanded and/or reduced around an origin 302, thereby forming concentric circles. Three optical sensors 322, 324, and 326 installed at the edge of a display panel 320 detect the optical signal. Time points when the three optical sensors 322, 324, and 326 detect the optical signal vary with the position of the origin 302. Since the position of each of the optical sensors 322, 324, and 326 and the distance therebetween are already known, the position of the origin 302 can be derived by comparing a time point when each of the optical sensors 322, 324, and 326 detects the optical signal with the period of expansion and/or reduction of the optical signal.

Figure 4:
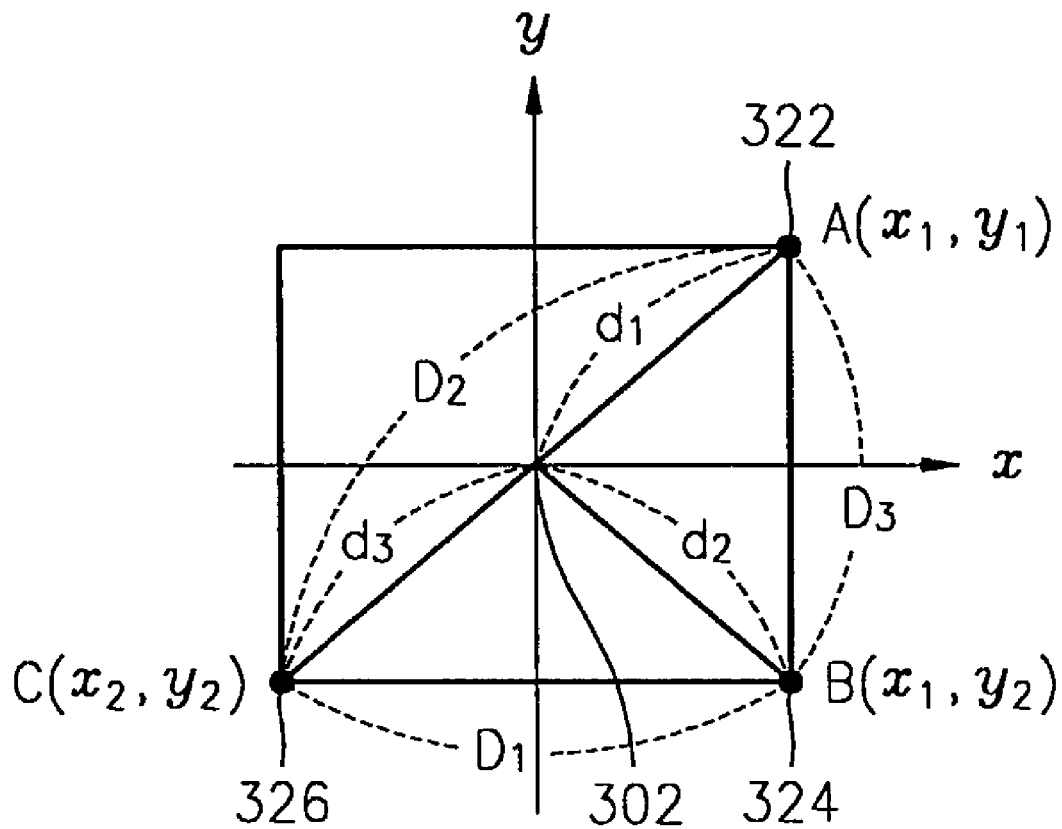
FIG. 4 is a diagram for explaining a procedure of detecting the origin using three optical sensors in a remote pointing method, according to the embodiment shown in FIG. 3.

FIG. 4 is a diagram for explaining a procedure of detecting the origin using three optical sensors in a remote pointing method, according to the embodiment shown in FIG. 3. In FIG. 4, it is assumed that the positions of the three optical sensors 322, 324, and 326 with respect to the origin 302 are $A(x_1, y_1)$, $B(x_1, y_2)$, and $C(x_2, y_2)$, respectively, and the distances from the origin 302 to the optical sensors 322, 324, and 326 are $d_1$, $d_2$, and $d_3$, respectively. Then $x_1^2+y_1^2=d_1^2$, $x_1^2+y_2^2=d_2^2$, $x_2^2+y_2^2$'$y_1-y_2=D_3$, and $x_1-x_2=D_1$.

The positions of the respective optical sensors 322, 324, and 326 with respect to the origin 302 are calculated using a time point when an optical signal starts to be generated from the origin 302 and time points when the respective optical sensors 322, 324, and 326 detect the optical signal. Since the optical signal generated from the remote controller is a diffuse light whose projection area increases as its traveling distance increases, the maximum radius of the optical signal projected on the display panel 320 varies with the distance between the remote controller and the display panel 320.

In other words, when the period of expansion and/or reduction of the optical signal generated from the remote controller is fixed, a period with which the optical signal is detected at the display panel 320 varies with the distance between the remote controller and the display panel 320, and the detection period is proportional to the distance. Accordingly, the maximum radius of the optical signal projected on the display panel 320 can be obtained using the detection period, and the distances $d_1$, $d_2$, and $d_3$ from the origin 302 to the respective optical sensors 322, 324, and 326 are calculated by comparing a time point when the optical signal starts to be expanded or reduced with a time point when the optical signal is detected.

However, in a usual case, for example, in a case where a user points at a certain position on the display panel 320 in a living room, it may be assumed that the distance between the remote controller and the display panel 320 is fixed. If it is assumed that the user rarely operates the remote controller within a near distance of, for example, 1 meter and beyond a far distance of, for example, 5 meters from the display panel 320, it may be assumed that the distance from the remote controller and the display panel 320 is 3 meters.

When the distance from the remote controller and the display panel 320 is about 3 meters, the maximum radius of the optical signal projected on the display panel 320 varies just slightly with the distance. In addition, in video processing apparatuses such as digital televisions (DTVs), not a fine point but a menu item, having a selection area to some extent, is selected. Accordingly, it does not matter if it is assumed the distance between the remote controller and the display panel 320 is assumed to be 3 meters.

Using the above formulas and the distances $d_1$, $d_2$, and $d_3$ from the origin 302 to the respective optical sensors 322, 324, and 326, $x_1$ and $y_1$ can be given as follows:

$$x_1 = \frac{D_1^2 + d_2^2 - d_3^2}{2D_1}$$

$$y_1 = \frac{D_3^2 + d_1^2 + d_2^2}{2D_3}$$

Here, $x_1$ and $y_1$ are coordinates with respect to the origin 302, and the coordinates of each of the optical sensors 322, 324, and 326 are already known. Accordingly, the position of the origin 302 can be detected using these coordinates. The above computations can be performed using a central processing unit (CPU).

In a remote pointing method according to the present invention, various methods can be used to expand and/or reduce an optical signal. For example, an optical signal may be repeatedly either expanded from the origin 302 or reduced to the origin 302.

In another method, an optical signal may be alternately expanded and reduced. That is, the radius of the optical signal around the origin 302 increases for a predetermined period of time and then decreases for a predetermined period of time.

In still another method, an optical signal may be expanded and/or reduced in a spiral. That is, a track of the optical signal having a certain width forms a spiral while the radius of the optical signal around the origin 302 either increases for a predetermined period of time or decreases for a predetermined period of time. Here, the width of the optical signal must be wide enough to be detected by an optical sensor. In this case, the optical signal may be also only expanded or only reduced, or may be alternately expanded and reduced. Alternatively, the optical signal may be expanded and/or reduced in a doughnut pattern.

In still another method, the radius of an optical signal may be increased discontinuously. In this case, the optical signal may be also only expanded or only reduced, or may be alternately expanded and reduced. As used herein, the term "discontinuous" describes a pattern of an optical signal to be projected on a screen. As described herein, the projection area of the optical signal is repeatedly expanded and/or reduced. In this respect, a discontinuous optical pattern looks like an assembly of concentric circles (like circles on a target board) or like a spiral, i.e., there are several circular intervals on which the optical signal is not projected.

In a remote pointing method according to the present invention, a laser beam may be used to visibly indicate the origin 302. When the origin 302 is indicated using a laser beam, it is effective for a user to intuitively recognize the origin 302. However, since the laser beam may be fatally harmful to human eyes, it may not be safe to use the laser beam.

Instead of using the laser beam, a cursor can be displayed at the origin 302 that is detected using the optical sensors 322, 324, and 326 to visibly indicate the origin 302.

In a remote pointing method according to the present invention, a period of time for which an optical signal is generated from a remote controller may be set in various manners. Since power consumption is very high when the optical signal is continuously generated from the remote controller, a remote pointing apparatus can be designed to be operated only when a pointing operation is necessary.

For example, when an operation is performed on a menu, a remote pointing apparatus is operated only while the menu is activated. In other words, only while the menu is displayed on the display panel 320, an optical signal is generated so that power consumption can be decreased.

When a laser beam source is used, a remote pointing apparatus is operated only when the laser beam source is activated. In other words, only while the laser beam source is activated, an optical signal is generated forming concentric circles so that power consumption can be decreased.

It is preferable to dispose the optical sensors 322, 324, and 326 to form a right triangle. Even if they are not disposed in a right triangle, the position of the origin 302 can be detected if only the positions of the optical sensors 322, 324, and 326 are known. However, computation is more complex than in the right triangle case.

It is also preferable to install the optical sensors 322, 324, and 326 at the edge of the display panel 320 and particularly on a case that includes the display panel 320. The optical sensors 322, 324, and 326 may be installed on a cathode-ray tube (CRT) or a liquid crystal display (LCD). However, such installation makes processes difficult and partially encroaches a display area.

When a command input device having a plurality of selection buttons is used, the optical sensors 322, 324, and 326 are installed around the command input device.

Figure 5:
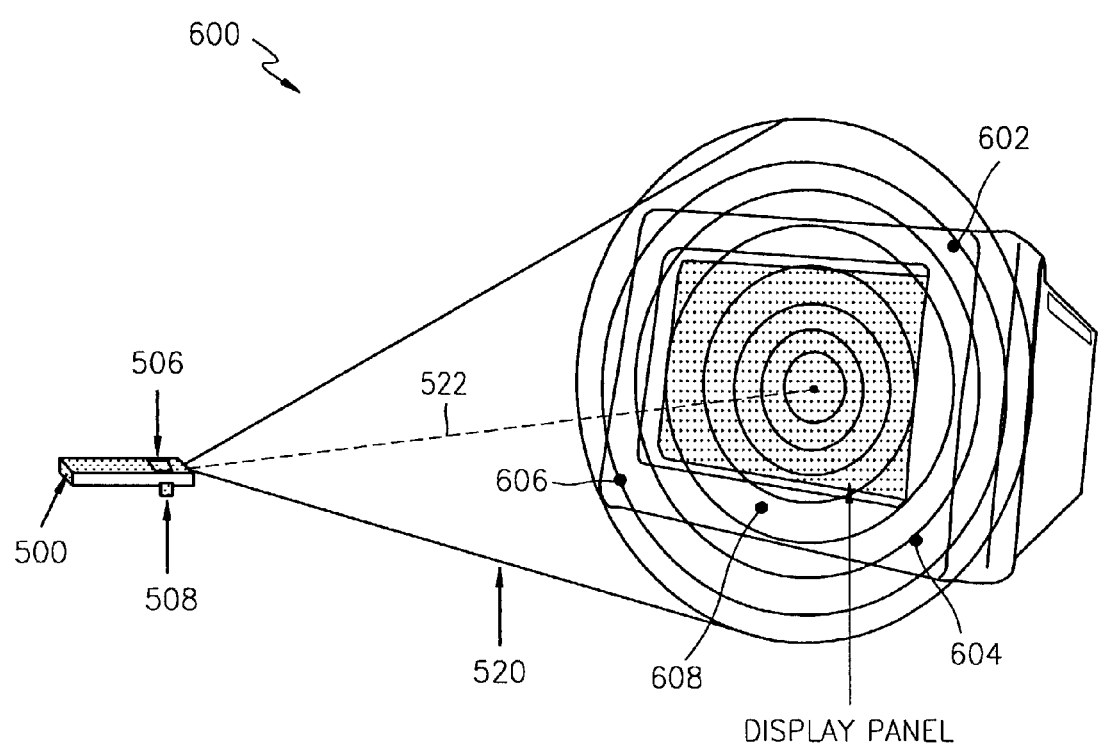
FIG. 5 is a diagram of a remote pointing apparatus, according to an embodiment of the present invention.

FIG. 5 is a diagram of a remote pointing apparatus 600 according to another embodiment of the present invention. As shown in FIG. 5, the remote pointing apparatus 600 includes a remote controller 500 and three optical sensors 602, 604, and 606.

The remote controller 500 includes a usual control signal transceiver using an infrared or wireless mode, a light source (not shown) which emits diffusive invisible light 520 for remote pointing, and a light transmission adjustor (not shown) which adjusts a transmission state of light emitted from the light source.

The optical sensors 602, 604, and 606 are disposed, for example, in the case of a display apparatus to form a right triangle. The results of detection of the optical sensors 602, 604, and 606 are analyzed by a main body (not shown) to detect the position of the origin.

Figure 6:
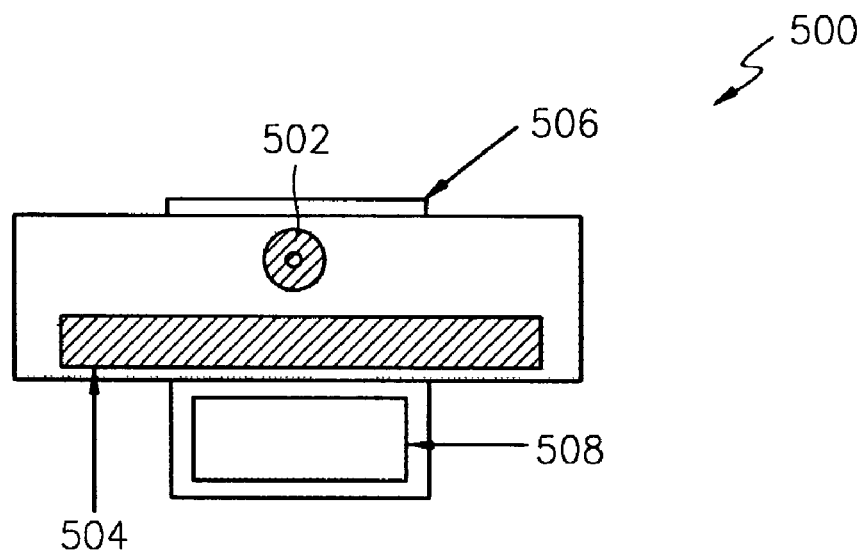
FIG. 6 is a front view of the remote controller shown in FIG. 5.

FIG. 6 is a front view of the remote controller 500 shown in FIG. 5. As shown in FIG. 6, the remote controller 500 includes a light emitter 502, an infrared ray emitter 504, a pointer on/off button 506, and a selection button 508. The light emitter 502 includes an invisible light source (not shown), a laser beam source (not shown), and a light transmission adjustor (not shown).

The pointer on/off button 506 is provided to start a remote pointing operation. When the pointer on/off button 506 is pressed, the invisible light source and the laser beam source operate to generate the invisible light 520 and a laser beam 522, respectively. In addition, the light transmission adjustor operates to adjust a transmission state of light generated from the invisible light source. The transmission state of light generated from the invisible light source is adjusted according to the pattern of an optical signal projected on a display apparatus, that is, the pattern of light transmission range. Particularly, the transmission state of light is adjusted such that the pattern of light projected on the display apparatus is periodically expanded and/or reduced.

The selection button 508 is provided to select a desired point. When the selection button 508 is pressed, a control signal indicating a selection state is applied through the infrared ray emitter 504 to the main body. Then, the main body recognizes the origin of the invisible light 520 as a selected point in response to the control signal and performs operations according to the recognition. For example, when the origin of the invisible light 520 is positioned at a certain item of the menu, the main body recognizes the certain item as being selected and carries out operations according to commands corresponding to the item.

The light emitter 502 shown in FIG. 6 includes the invisible light source, the laser beam source, and the light transmission adjustor. The laser beam source is used to indicate the origin of the invisible light 520 but may be excluded for safety's sake. When the laser beam source is excluded, the main body periodically detects the position of the origin of the invisible light 520 while the pointer on/off button 506 is being pressed to perform a remote pointing operation and displays a cursor at the position of the origin to allow a user to intuitively recognize the pointing position.

Figure 7:
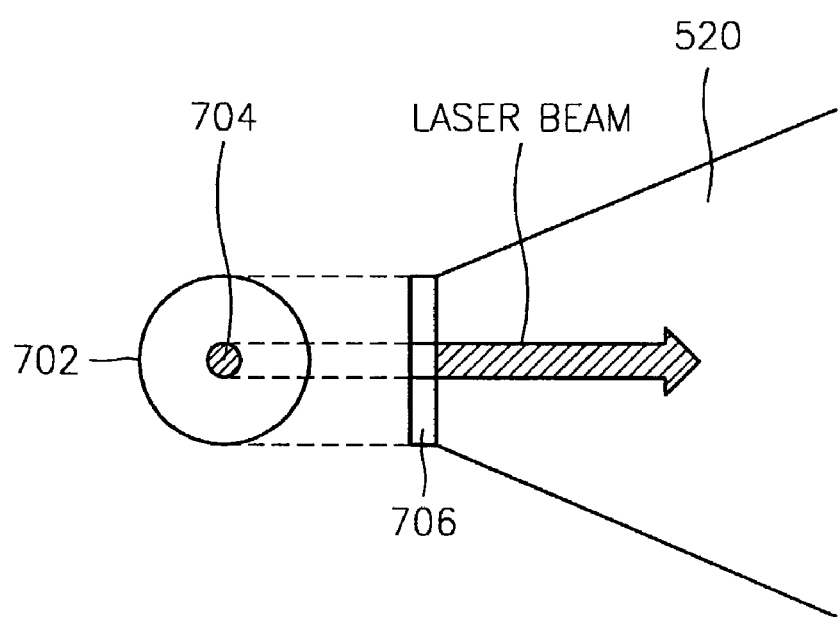
FIG. 7 is a diagram of the disposition of an invisible light source and a laser beam source, according to an embodiment of the present invention.

In addition, it is preferable to position the laser beam source on the optical axis of the invisible light source in order to reduce an error in indicating the origin. Accordingly, as shown in FIG. 7, an invisible light source 702 preferably has a structure of surrounding a laser beam source 704. A light transmission adjustor 706 is disposed in front of the invisible light source 702, that is, on a path in which light is projected. The light transmission adjustor 706 may be manifested as a shutter or liquid crystal.

Figure 8:
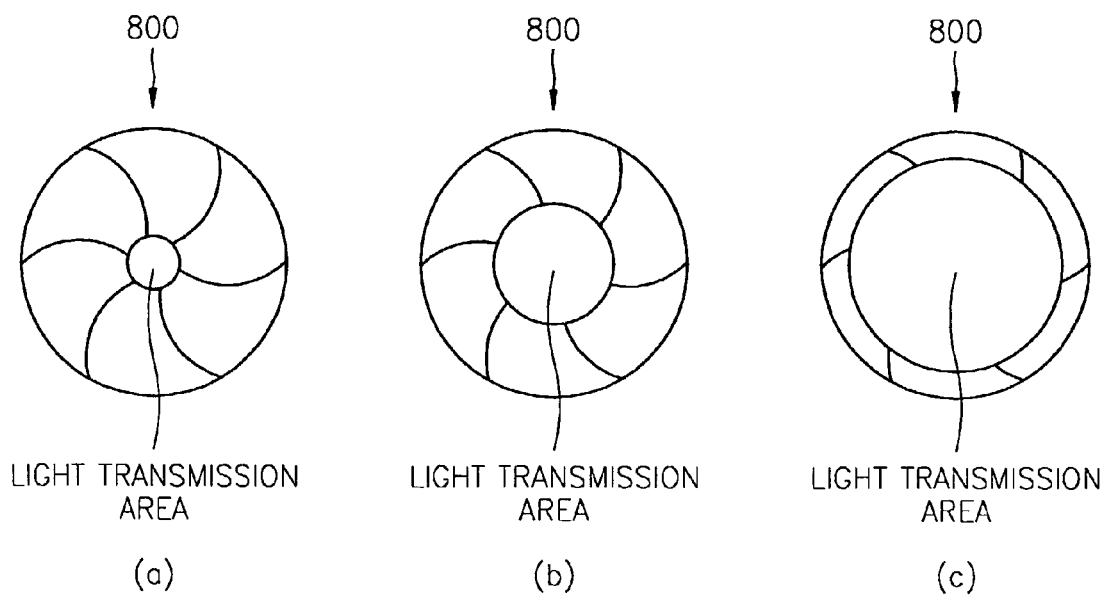
FIG. 8 is a diagram for explaining a procedure of adjusting a state in which light is transmitted when the light transmission adjustor shown in FIG. 7 is manifested as a shutter.

FIG. 8 is a diagram for explaining a procedure of adjusting a state in which light is transmitted when the light transmission adjustor 706 shown in FIG. 7 is manifested as a shutter 800. The shutter 800 operates in the same manner as a shutter of a usual camera.

As shown in FIG. 8, the opening area of the shutter 800 periodically changes from (a) to (b) and to (c). Accordingly, an area in which the invisible light 520 generated from the invisible light source 702 is transmitted also changes. As a result, a pattern in which the invisible light 520 is projected on a display apparatus changes. In other words, since the opening area of the shutter 800 periodically changes, the pattern of the invisible light 520 projected on the display apparatus also periodically changes.

Each of the optical sensors 602, 604, and 606 installed in the display apparatus generates a detection signal when it is irradiated by the invisible light 520. The main body analyzes detection time instants of the respective optical sensors 602, 604, and 606 and compares them with a predetermined light change period, that is, a period of opening and closing of the shutter 800, to detect the position of the origin.

When the shutter 800 is used, as shown in FIG. 8, it is difficult to form the invisible light 520 projected on the display apparatus in a spiral or doughnut pattern and change the radius of the pattern of the invisible light 520.

However, it is possible to form the invisible light 520 projected on the display apparatus in a circular pattern and change the radius of the pattern of the invisible light 520. It is also possible to continuously or discontinuously change the radius of the pattern of the invisible light 520. When discontinuously changing the radius of the pattern of the invisible light 520, an interval between discontinuous changes is determined based on the size of each of the optical sensors 602, 604, and 606 in order to minimize the cases in which optical sensors 602, 604, and 606 cannot detect an optical signal. Alternatively, the interval between discontinuous changes may be determined based on a pointing resolution, that is, a margin in which a recognition error can be tolerated. For example, when selecting a menu, each item displayed on a display panel occupies at least an area enough to allow a user to recognize the existence of the item, and about half of the area may function as the margin in which a recognition error can be tolerated.

Figure 9A:
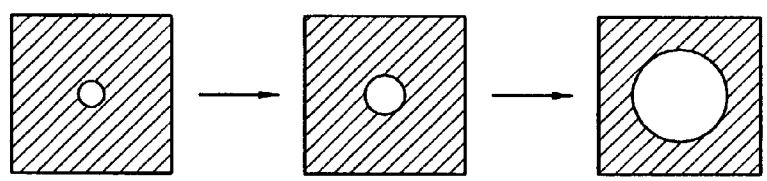
FIGS. 9A and 9B are diagrams for explaining a procedure of adjusting a state in which light is transmitted when the light transmission adjustor shown in FIG. 7 is manifested as a liquid crystal.
Figure 9B:
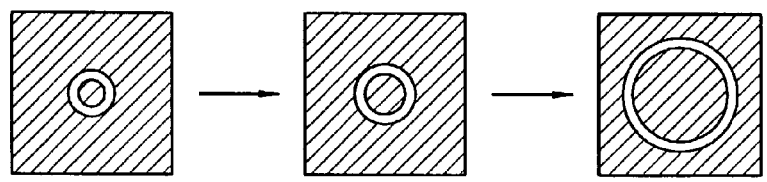

FIGS. 9A and 9B are diagrams for explaining a procedure of adjusting a state in which light is transmitted when the light transmission adjustor 706 shown in FIG. 7 is manifested as a liquid crystal 900. An image is formed on the liquid crystal 900 in order to transmit and shield an optical signal generated from the invisible light source 702.

When using the liquid crystal as the light transmission adjustor 706, the pattern of the invisible light 520 projected on the display apparatus is much more freely adjustable than when using the shutter 800. In other words, when the image formed on the liquid crystal to transmit light has a circular shape, as shown in FIG. 9A, the pattern of the invisible light 520 projected on the display apparatus is a circle. When the image for transmitting light has a doughnut shape, as shown in FIG. 9B, the pattern of the invisible light 520 projected on the display apparatus is a doughnut. In FIGS. 9A and 9B, the hatched portions do not transmit the invisible light 520, and the nonhatched portions transmit the invisible light 520.

Figure 10:
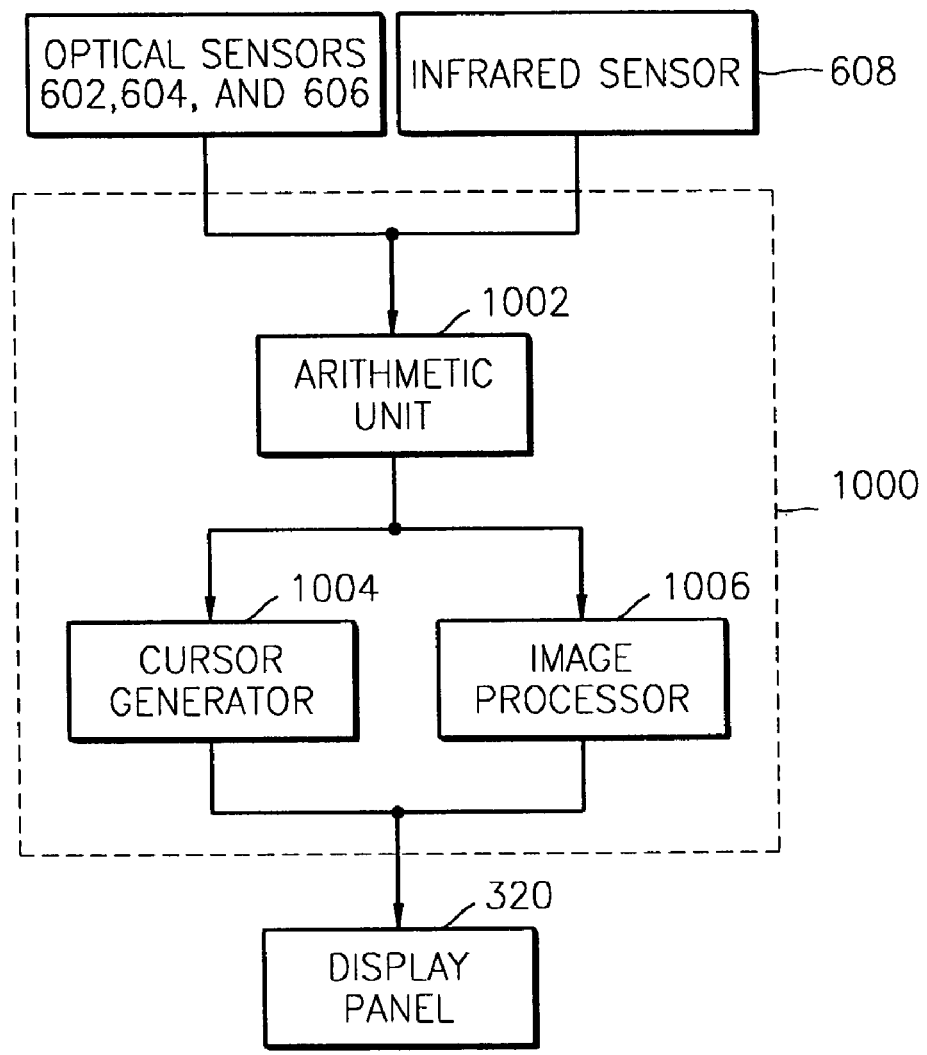
FIG. 10 is a diagram of a main body that detects the position of the origin and performs operation corresponding to the detected position, according to an embodiment of the present invention.

FIG. 10 is a diagram of a main body 1000 which detects the position of the origin and performs operation corresponding to the detected position, according to an embodiment of the present invention. The optical sensors 602, 604, and 606 may be integrated into the main body 1000 or may be formed separately from the main body 1000. As shown in FIG. 10, the main body 1000 includes an arithmetic unit 1002, a cursor generator 1004, and an image processor 1006.

The infrared sensor 608 receives an infrared signal generated from the infrared ray emitter 504 of the remote controller 500 shown in FIG. 6. The main body 1000 receives control signals from and transmits control signals to the remote controller 500 according to infrared communication already known. The arithmetic unit 1002 detects the position of the origin based on the results of detections of the optical sensors 602, 604, and 606 and the infrared sensor 608. The cursor generator 1004 controls a cursor to be displayed at the position of the origin detected by the arithmetic unit 1002. The image processor 1006 processes an image signal input to the display apparatus and a cursor image generated by the cursor generator 1004 and provides the results of processing to the display panel 320.

Figure 11:
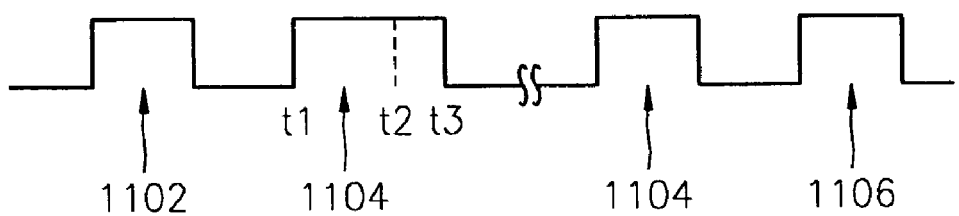
FIG. 11 shows an example of a control signal for a remote pointing operation, according to an embodiment of the present invention.

FIG. 11 shows an example of a control signal for remote pointing operation. When the pointer on/off button 506 of the remote controller 500 is pressed, a control signal shown in FIG. 11 is applied to the main body 1000 through the infrared ray emitter 504.

In FIG. 11, reference numeral 1102 denotes a start signal indicating the start of the remote pointing operation. Reference numeral 1104 denotes a radiation reporting signal indicating a duration for which the invisible light 520 is radiated. Reference numeral 1106 denotes a selection signal indicating that selection is performed. Since a state in which the invisible light 520 is projected periodically changes, the radiation reporting signal 1104 is also periodically generated.

At a time instant t1 when the radiation reporting signal 1104 rises, the invisible light 520 is radiated at the origin only. At a time instant t3 when the radiation reporting signal 1104 falls, the radiation area of the invisible light 520 is a maximum. In the duration between the time instants t1 and t3, the radiation area of the invisible light 520 on the display apparatus is under expansion. A duration between the time instants t1 and t2 is proportional to the radiation area of the invisible light 520 on the display apparatus, that is, the radius of the invisible light 520 projected on the display apparatus around the origin.

The time instant t1 is detected by the infrared sensor 608, and the time instant t2 is detected by each of the optical sensors 602, 604, and 606. The arithmetic unit 1002 can detect the position of the origin using the time instant t1 and time instants t2 detected by the optical sensors 602, 604, and 606.

When the selection button 508 of the remote controller 500 is pressed, the selection signal 1106 is transmitted through the infrared ray emitter 504 and the infrared sensor 608 to the arithmetic unit 1002. On receiving the selection signal 1106, the arithmetic unit 1002 detects the position of the origin at present and performs an operation corresponding to the position of the origin, for example, a menu item.

A remote pointing apparatus according to the present invention can be used for selecting a menu on a display apparatus and can also be used for other various purposes. For example, by applying a remote pointing apparatus of the present invention to a command input device having a plurality of selection buttons, one among the selection buttons can be remotely selected. In an embodiment, a remote pointing apparatus of the present invention can be applied to a navigation apparatus that displays a map on a window of a vehicle. For example, optical sensors are disposed around a map display area so that a selected position can be recognized using the optical sensors when the position is selected using a remote controller.

As described above, since a remote pointing apparatus of the present invention does not need a flat ground that is needed on which to put a conventional mouse, it is convenient for a user to freely use in the living room of a house. In addition, unlike a conventional method using a laser beam, since a remote pointing apparatus of the present invention does not need a light receiving panel that is installed to fully cover a display screen or installed in vertical and horizontal directions of the display panel in order to receive a laser beam, it is economical.

The components included in the system may include memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A remote pointing method comprising:
   projecting an optical signal that is periodically expanded and/or reduced around an origin;
   detecting whether the optical signal is received using a plurality of optical sensors that are two-dimensionally disposed;
   detecting the position of the origin, which exists within a position recognition range including at least a polygon having the optical sensors as vertexes, based on the results of detection of the optical sensors;
   radiating a visible laser beam at the origin of the optical signal to allow a user to visibly recognize the origin; and
   generating an infrared signal indicating a time instant when an area of the optical signal projected on the position recognition range starts to increase around the origin and an infrared signal indicating a time instant when the area of the optical signal is a maximum,
   wherein the detecting of the position of the origin comprises receiving the infrared signals, recognizing the time instant when the area of the optical signal projected on the position recognition range starts to increase, and comparing the recognized time instant with a time instant when each optical sensor receives the optical signal to calculate the position of the origin.

2. The remote pointing method of claim 1, wherein the optical signal is invisible light.

3. The remote pointing method of claim 1, wherein the shape of the optical signal projected on the position recognition range is a circle, spiral, or doughnut.

4. The remote pointing method of claim 3, wherein when the shape of the optical signal is a doughnut, the width of the optical signal is broader than the size of the optical sensor or resolution required for a command input device.

5. The remote pointing method of claim 3, wherein the radius of the optical signal projected on the position recognition range continuously increases and/or decreases over time.

6. The remote pointing method of claim 3, wherein the radius of the optical signal projected on the position recognition range discontinuously increases and/or decreases over time.

7. The remote pointing method of claim 6, wherein discontinuous time intervals are narrower than a resolution required in the position recognition range.

8. The remote pointing method of claim 6, wherein discontinuous time intervals are less than a minimum width of each optical sensor that allows detection of the optical signal.

9. The remote pointing method of claim 1, wherein the detecting of the position of the origin comprises comparing an already-known period of expansion and/or reduction of the optical signal with a period with which the optical signal is detected by the optical sensors so as to calculate a distance between a light source generating the optical signal and the position recognition range and calculating the position of the origin based on the calculated distance and the time instants when the optical sensors receive the optical signal.

10. The remote pointing method of claim 1, further comprising displaying a cursor at the detected origin of the optical signal in order to allow a user to visibly recognize the origin.

11. The remote pointing method of claim 1, wherein the number of optical sensors is at least three.

12. The remote pointing method of claim 11, wherein the number of optical sensors is three, and the optical sensors are installed at the periphery of the position recognition range to form a right triangle.

13. The remote pointing method of claim 11, wherein the optical sensors are installed at the periphery of the position recognition range to form a right isosceles triangle.

14. A remote pointing apparatus comprising:
a remote controller that generates an optical signal that is periodically expanded and/or reduced around an origin;
a plurality of optical sensors that are disposed at the periphery of a position recognition range; and
an arithmetic unit that calculates the position of the origin, which exists within the position recognition range, based on a state in which the optical signal is received by each optical sensor,
wherein the remote controller comprises a laser beam source which radiates a visible laser beam at the origin of the optical signal in order to allow a user to visibly recognize the origins,
wherein the remote controller further comprises an infrared ray emitter that generates an infrared signal indicating a time instant when an area of the optical signal projected on the position recognition range starts to increase around the origin and an infrared signal indicating a time instant when the area of the optical signal is a maximum, and
wherein the arithmetic unit receives the infrared signals, recognizes the time instant when the area of the optical signal projected on the position recognition range starts to increase, and compares the recognized time instant with a time instant when each optical sensor receives the optical signal to calculate the position of the origin.

15. The remote pointing apparatus of claim 14, wherein the remote controller comprises:
a light source that generates a diffusive optical signal; and
a light transmission adjustor that adjusts the shape of the optical signal that is projected on the position recognition range.

16. The remote pointing apparatus of claim 15, wherein the light source generates invisible light.

17. The remote pointing apparatus of claim 15, wherein the light transmission adjustor adjusts light transmission such that the shape of the optical signal projected on the position recognition range is a circle, spiral, or doughnut.

18. The remote pointing apparatus of claim 17, wherein when the shape of the optical signal is a doughnut, the width of the doughnut is broader than resolution required in the position recognition range.

19. The remote pointing apparatus of claim 17, wherein the light transmission adjustor adjusts light transmission such that the radius of the optical signal projected on the position recognition range continuously increases and/or decreases over time.

20. The remote pointing apparatus of claim 19, wherein the light transmission adjustor adjusts light transmission such that the radius of the optical signal projected on the position recognition range discontinuously increases and/or decreases over time.

21. The remote pointing apparatus of claim 20, wherein discontinuous intervals are narrower than resolution required in the position recognition range.

22. The remote pointing apparatus of claim 20, wherein discontinuous intervals are less than a minimum width of each optical sensor which allows detection of the optical signal.

23. The remote pointing apparatus of claim 15, wherein the light transmission adjustor is a shutter.

24. The remote pointing apparatus of claim 15, wherein the light transmission adjustor is a liquid crystal on which an image is formed to transmit and/or shield the optical signal generated from the light source.

25. The remote pointing apparatus of claim 14, wherein the arithmetic unit compares an already-known period of expansion and/or reduction of the optical signal with a period, with which the optical signal is detected by the optical sensors, so as to calculate a distance between a light source generating the optical signal and the position recognition range and calculates the position of the origin based on the calculated distance and the time instants when the optical sensors receive the optical signal.

26. The remote pointing apparatus of claim 14, further comprising a cursor generator that generates a cursor image to be displayed at the origin of the optical signal calculated by the arithmetic unit in order to allow a user to visibly recognize the origin.

27. The remote pointing apparatus of claim 14, wherein the number of optical sensors is at least three.

28. The remote pointing apparatus of claim 27, wherein the number of optical sensors is three, and the optical sensors are installed at the periphery of the position recognition range to form a right triangle.

29. The remote pointing apparatus of claim 28, wherein the optical sensors are installed at the periphery of the position recognition range to form a right isosceles triangle.

30. A remote controller comprising:
a light source that generates a diffusive optical signal;
a light transmission adjustor that adjusts the projected shape of the optical signal; and
an infrared ray emitter which generates an infrared signal indicating a time instant when an area of the optical signal projected on the position recognition range starts to increase around the origin and an infrared signal indicating a time instant when the area of the optical signal is a maximum.

31. The remote controller of claim 30, wherein the light source generates invisible light.

32. The remote controller of claim 30, wherein the light transmission adjustor adjusts light transmission such that the projected shape of the optical signal is a circle, spiral, or doughnut.

33. The remote controller of claim 32, wherein when the projected shape of the optical signal is a doughnut, the width of the doughnut is broader than resolution required for an optical sensor that detects the optical signal.

34. The remote controller of claim 30, wherein the light transmission adjustor adjusts light transmission such that the radius of the optical signal continuously increases and/or decreases over time.

35. The remote controller of claim 30, wherein the light transmission adjustor adjusts light transmission such that the radius of the optical signal discontinuously increases and/or decreases over time.

36. The remote controller of claim 35, wherein discontinuous intervals are narrower than resolution required for an optical sensor that detects the optical signal.

37. The remote controller of claim 30, wherein the light transmission adjustor is a shutter.

38. The remote controller of claim 30, wherein the light transmission adjustor is a liquid crystal on which an image is formed to transmit and/or shield the optical signal generated from the light source.

39. A display apparatus comprising:
a plurality of optical sensors that detect a state in which an optical signal that is periodically expanded and/or reduced around an origin is received and are disposed at the periphery of a display screen;
an arithmetic unit that calculates the position of the origin based on the receiving state detected by each optical sensor; and
an infrared sensor that detects an infrared signal indicating a time instant when an area of the optical signal projected on the display screen starts to increase around the origin and an infrared signal indicating a time instant when the area of the optical signal is a maximum, and
wherein the arithmetic unit receives the infrared signals, recognizes the time instant when the area of the optical signal projected on the display screen starts to increase, and compares the recognized time instant with a time instant when each optical sensor receives the optical signal to calculate the position of the origin.

40. The display apparatus of claim 39, wherein the number of optical sensors is at least three.

41. The display apparatus of claim 39, wherein the number of optical sensors is three, and the optical sensors are installed at the periphery of the display screen to form a right triangle.

42. The display apparatus of claim 39, wherein the optical sensors are installed at the periphery of the display screen to form a right isosceles triangle.

43. The display apparatus of claim 39, further comprising a cursor generator that generates a cursor image to be displayed at the origin of the optical signal calculated by the arithmetic unit in order to allow a user to visibly recognize the origin.

44. A system, comprising:
a remote controller, comprising:
an invisible light source to transmit invisible light around an origin when the invisible light source is active,
a laser source, which is surrounded by the invisible light source, to indicate the origin of the invisible light when the laser source is active,
a light transmission adjuster, which is positioned in front of the invisible light source, to adjust the transmission state of the invisible light such that the radius of transmitted invisible light is expanded, reduced, or expanded and reduced around the origin at a predetermined period,
a pointer on/off button to activate and deactivate the laser source,
a selection button to register a selection, and
an infrared ray source to transmit an infrared control signal indicating the selection, whether the laser source is inactive, and whether the invisible light source is active;
a display unit, comprising:
three optical sensors, which are positioned at predetermined positions on the display unit, wherein each optical sensor detects the invisible light at a particular time, and
an infrared sensor to detect the infrared control signal;
an arithmetic unit to calculate the origin of the invisible light based on the predetermined positions of the optical sensors, the predetermined period of expansion or reduction of the pattern of transmitted invisible light, a time of a start of transmission of the invisible light, and the particular times; and
a processor to cause the display unit to indicate the calculated origin when the laser source is inactive.

45. The system of claim 44, wherein the three optical sensors are positioned on the display unit such that each of the three optical sensors forms a vertex of a polygon.

46. The system of claim 45, wherein the polygon is a triangle.

47. The system of claim 46, wherein the triangle is an isosceles right triangle.

48. The system of claim 44, wherein the light transmission adjuster is a shutter.

49. The system of claim 44, wherein the light transmission adjuster is a liquid crystal.

50. The system of claim 44, wherein the display unit indicates the calculated origin using a displayed cursor.

51. The system of claim 44, wherein the selection is used to initiate an operation by the processor.

52. The system of claim 51, wherein the operation is a selection of a menu option.

53. The system of claim 52, wherein the invisible light source is active only when the menu option is displayed.

54. The system of claim 51, wherein the operation controls a navigation unit that displays a map on a vehicle window.

55. The system of claim 44, wherein the invisible light source is active only when the laser source is active.

56. The system of claim 44, wherein the light transmission adjuster adjusts the transmission state of the invisible light so that a projected shape of the invisible light is a circle, spiral, or doughnut.

57. The system of claim 44, wherein the radius of the invisible light is continuously expanded, continuously reduced, or continuously expanded and continuously reduced around the origin at a predetermined period.

58. The system of claim 44, wherein the radius of the invisible light is discontinuously expanded, discontinuously reduced, or discontinuously expanded and discontinuously reduced around the origin at a predetermined period.

59. The system of claim 44, wherein the display unit further comprises:
a display screen,
wherein the predetermined positions of the three optical sensors on the display unit are on edges of the display screen.

60. A remote controller, comprising:
an invisible light source to transmit invisible light around an origin when the invisible light source is active;
a laser source, which is surrounded by the invisible light source, to indicate the origin of the invisible light when the laser source is active;
a light transmission adjuster, which is positioned in front of the invisible light source, to adjust the transmission state of the invisible light such that the radius of transmitted invisible light is expanded, reduced, or expanded and reduced around the origin at a predetermined period; and
an infrared ray source to transmit an infrared control signal indicating the selection, whether the laser source is inactive, and a start of transmission of the invisible light.

61. The remote controller of claim 60, further comprising:
a pointer on/off button to deactivate the laser source; and
a selection button to register a selection.

62. The remote controller of claim 60, wherein the light transmission adjuster adjusts the transmission state of the invisible light so that a projected shape of the invisible light is a circle, spiral, or doughnut.

63. The remote controller of claim 60, wherein the radius of the invisible light is continuously expanded, continuously reduced, or continuously expanded and continuously reduced around the origin at a predetermined period.

64. The remote controller of claim 60, wherein the radius of the invisible light is discontinuously expanded, discontinuously reduced, or discontinuously expanded and discontinuously reduced around the origin at a predetermined period.

65. The remote controller of claim 60, wherein the invisible light source is active only when the laser source is active.

* * * * *

UNITED STATES PATENT AND TRADEMARK OFFICE
CERTIFICATE OF CORRECTION

PATENT NO. : 7,142,198 B2 Page 1 of 1
APPLICATION NO. : 10/289216
DATED : November 28, 2006
INVENTOR(S) : Jung-won Lee It is certified that error appears in the above-identified patent and that said Letters Patent is hereby corrected as shown below:

Column 11, Line 28, change "origins," to --origin,--.

Signed and Sealed this

Twenty-seventh Day of March, 2007

JON W. DUDAS
*Director of the United States Patent and Trademark Office*